3,347,832
CATIONIC HYDROXY-CONTAINING TERPOLYMERS, PREPARATION AND USE
Alan R. Mills, Oakland, Calif., assignor to Shell Oil Company, New York, N.Y., a corporation of Delaware
No Drawing. Filed Oct. 29, 1964, Ser. No. 407,573
19 Claims. (Cl. 260—72)

This invention relates to new terpolymers and their preparation. More particularly, the invention relates to new cationic hydroxy-containing terpolymers, to their preparation from unsaturated quaternary ammonium compounds, and to the use of these products, particularly for the treatment of fibrous materials, such as paper, textile materials, leather and the like.

Specifically, the invention provides new and particularly useful terpolymer products which possess a positive charge and a plurality of OH groups, said polymer being prepared by polymerizing a mixture containing (1) an ester of an ethylenically unsaturated acid and a dihydroxypropyl (or glycidyl) trialkylammonium salt, (2) and at least two dissimilar ethylenically unsaturated monomers, one of which preferably contains an active functional group, such as an aldehyde group, in the presence of a free radical catalyst.

As a special embodiment, the invention provides a new group of cationic hydroxy-containing water-soluble or water dispersible terpolymers which are outstanding as wet strength agents for paper and as flocculating agents, retention aids in the manufacture of paper and the like, which polymers are obtained by polymerizing a mixture containing (1) an ester of an ethylenically unsaturated carboxylic acid, such as acrylic or methacrylic acid, and a glycidyl trialkylammonium salt (or a dihydroxypropyl-trialkyl ammonium salt), (2) an ethylenically unsaturated aldehyde and (3) a dissimilar ethylenically unsaturated monomer, in the presence of the free radical catalyst.

As a further special embodiment, the invention provides a process for utilizing the above-noted cationic water-soluble terpolymers for the treatment of fibrous materials such as paper, to improve properties such as wet strength, abrasion resistance and the like, which comprises impregnating the fibrous material with an aqueous solution of the above-noted polymers, or alternatively utilizing the terpolymers at some stage during the formation of the said material.

Ordinary paper when wet loses its strength and is easily torn. In order to overcome this shortcoming, it has become common practice to treat the paper with a nitrogen-containing resin, such as urea- or melamine-formaldehyde resin, that can be subsequently cured to form an insoluble resin. While this method has imported some improvement in wet strength, it still leaves much to be desired for use on a commercial basis. The wet strength provided by this method, for example, is not as high as required for many applications. Also, these known resins are utilized in an acidic medium. This brings about corrosion problems and causes a loss in aging properties of the paper. In addition, the paper stock is not as free on the acid side as desired for efficient operation. Finally, the use of these agents in many cases requires the use of other materials, such as alum. Wet-strength resins are known which are effective under neutral conditions; these, however, are known to interfere with repulping operations.

It is an object of the invention, therefore, to provide a new class of cationic terpolymers. It is a further object to provide a new class of cationic terpolymers which are particularly useful both as sizing and wet strength agents for paper. It is a further object to provide a new cationic terpolymers of quaternary ammonium compounds, and a method for their preparation. It is a further object to provide new cationic water-soluble or dispersible polymers. It is a further object to provide new cationic terpolymers which are particularly useful for treating fibrous materials, such as paper, textiles, and the like to impart any strength thereto. It is a further object to provide new polymers for treating paper which may be used in neutral or alkaline medium. It is still a further object to provide new paper treating agents that may be used without alum and which do not interfere with repulping operations. It is a further object to provide a method for treating fibrous materials, to improve their dimensional stability and wet strength. It is a further object to provide new cationic terpolymers which are particularly useful as flocculating agents for clays and the like. It is a further object to provide terpolymers which are useful as retention aids for paper manufacture. It is a further object to provide new fiber-forming polymers which have improved dyeability. These and other objects of the invention will be apparent from the following detailed description thereof.

It has now been discovered that these and other objects may be accomplished by the new cationic hydroxy-containing terpolymers of the present invention which are prepared by polymerizing a mixture containing (1) an ester of an ethylenically unsaturated acid and a dihydroxypropyl (or glycidyl) trialkylammonium salt and (2) at least two dissimilar ethylenically unsaturated monomers, one of which preferably contains an active functional group, such as an aldehyde group, in the presence of a free radical catalyst. It has been surprisingly found that these terpolymers and particularly those which are water-soluble or dispersible are outstanding materials for treating fibrous materials as yarns, fibers, textile fabrics, paper and leather to improve their properties. The polymers, for example, have high substantivity to cellulosic materials. As a result, they can be either added at the wet end of paper manufacturing or on the finished paper to give an increase in wet strength and/or abrasion resistance of the paper. The new terpolymers also act as a sizing agent for the paper and textile material. The new terpolymers of the invention are also excellent flocculating agents and when used in small amounts are able to cause flocculation or precipitation of dispersed clays, ores and the like. The new terpolymers are particularly valuable as retention aids for inorganic fillers in paper manufacture. The new polymers which contain fiber-forming monomers, such as acrylonitrile, etc. can be formed into fibers having greatly improved dyeability.

One of the monomers use in preparing the new terpolymers of the invention comprise the esters of ethylenically unsaturated carboxylic acids and 2,3-dihydroxypropyl (or glycidyl) trialkylammonium salts. The unsaturated acids used in making the esters are the hydrocarbon carboxylic acids possessing at least one carboxy group and at least one ethylenic linkage, i.e., a non-aromatic carbon-carbon double bond, which ethylenic linkage(s) constitute the only carbon-carbon unsaturation in the molecule. Preferred acids are acyclic lower alkenoic acids which contain from 1 to 2 carboxy groups, from 1 to 2 ethylenic linkages and contain from 3 to 6 carbon atoms including the carboxy carbon atom(s). Illustrative of monocarboxylic alkenoic acids of this type are acrylic acid, methacrylic acid, crotonic acid, 3-pentenoic acid, sorbic acid, 2-methyl-2-butenoic acid, ethacrylic acid and 4-hexenoic acid; while illustrative dicarboxylic alkanoic acids include maleic acid, fumaric acid, citraconic acid, mesaconic acid, itaconic acid, 2-methylene glutaric acid and 2-pentendioic acid. In general, monocarboxylic acids are preferred over analogous dicarboxylic acids, and further preferred are those monocarboxylic alkenoic acids wherein the ethylenic linkage is conjugated with the carboxy group and is a terminal ethylenic linkage; these are acrylic acid and the alpha-alkyl derivatives thereof wherein the alkyl has from 1 to 3 carbon atoms, particularly 1 carbon atom.

The glycidyl trialkylammonium salts used in making the above esters comprise those compounds having a quaternary nitrogen atom to which are attached three alkyl radicals and a glycidyl, i.e., 2,3-epoxypropyl, radical. The nitrogen, being tetravalent, is positively charged, and in the reactants of the invention is associated by means of an ionic bond with a negatively charged salt group. Suitable glycidyl trialkylammonium salts contain alkyl groups which preferably contain from 1 to 20 carbon atoms. While those compounds containing alkyl groups of 1 to 12 carbon atoms are outstanding, the compounds having at least one alkyl group containing 12 to 20 carbon atoms find applicable, particularly in preparing terpolymers useful for imparting better water resistance to water.

The anion or salt portion of the compound may be of any type. They may be deprived from any type of inorganic acid which may be mono- or polybasic. Preferred salt groups are those containing at least one of the elements of the group consisting of oxygen, nitrogen, sulfur, halides, phosprous or boron. Examples include, among others, the nitrates, sulfates, perchlorates, bromides, chlorides, iodides, fluorides, phosphates, and the like.

Preferred glycidyl trialkylammonium salts may be represented by the formula

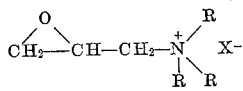

wherein X is a salt group and R is alkyl having from 1 to 20 carbon atoms. Preferred are glycidyl trialkylammonium halides of the above-depicted formula wherein at least two, more preferably three, of the alkyls are lower alkyl, that is, contain from 1 to 4 carbon atoms. Illustrative of such compounds are glycidyl trimethylammonium chloride, glycidyl triethylammonium bromide, glycidyl dimethylhexylammonium chloride, glycidyl dipropyldecylammonium bromide, glycidyl triethyl ammonium nitrate, glycidyl tributyl ammonium sulfate, glycidyl triethyl ammonium perchlorate, glycidyl dimethyllaurylammonium chloride, glycidyldiethylpropylammonium chloride, glycidyl trimethylammonium iodide, glycidylmethylethylamylammonium bromide, glycidyl tridodecylammonium sulfate, glycidyltributylammonium chloride, and glycidyl trimethylammonium bromide, glycidyl trioctodecyl ammonium fluoride. In general, quaternary ammonium halides are preferred, and most preferred as the quaternary ammonium halide reactants are the glycidyl trialkylammonium chlorides.

The quaternary ammonium halides are conveniently prepared by reaction of the appropriate trialkylamine and alpha-halo epoxyalkyl compounds in aprotic reaction diluent. For example, from trimethylamine and epichlorohydrin is prepared glycidyltrimethylammonium chloride. The other salts, such as nitrates, etc. can be prepared from the halide by passing the halide through appropriate ion-exchange column.

The glycidyl trialkyl ammonium salts are employed in aqueous solution. Although the presence of other miscible solvents, e.g., alcohols, particularly lower alkanols of from 1 to 4 carbon atoms, does not appear to be overly detrimental to the process of the invention, no advantage is obtained by the use thereof, and in the preferred modification of the process of the invention, only water is present as solvent. The concentration of glycidyl trialkylammonium salt in the aqueous solution is not critical, and concentrations from about 20% to about 90% by weight glycidyl trialkylammonium salt are satisfactorily utilized. Preferred, however, are concentrations from about 50% to about 80% by weight.

Other processes, however, can also be employed for the preparation of these cationic esters.

The above-described quaternary ammonium salt monomers are polymerized with at least two dissimilar monomers. Dissimilar monomers that may be used in making the new terpolymers include those possessing at least one polymerizable ethylenic linkage, such as, for example, maleic acid, maleic acid esters, tetrahaloethylenes, 1,4-butenediol diacetate, 1,4-butenediol dimethacrylate, cyclohexene, 2,2-bis(3-cyclohexenyl)propane and the like. Particularly preferred are the monomers containing at least one terminal $CH_2=C=$ group, such, as, for example, alkene-1 as ethylene, propylene, isobutylene, octene-1; alkenyl-substituted aromatics, styrene, alpha-methyl as styrene, dichlorostyrene, vinyl naphthalene, vinyl phenol, and the like; esters of unsaturated acids, such as alkyl alkenoates as methyl acrylate, methyl methacrylate, butyl methacrylate and propyl acrylate; vinylidene halides, such as vinylidene bromide, vinylidene chloride; vinyl esters of inorganic acids, such as the halogen acids and hydrocyanic acid as vinyl chloride, vinyl bromide, acrylonitrile and methacrylonitrile; vinyl esters of the monocarboxylic acids, such as vinyl acetate, vinyl chloroacetate, vinyl benzoate, vinyl laurate, vinyl valerate, and vinyl caproate; vinyl ethers, such as vinyl ethyl ether, and the vinyl ketones, such as vinyl butyl ketone, and vinyl ethyl ketone.

Especially preferred monomers are the monomers which are neutral or cationic, such as, vinylidene halides, the alkyl esters of acrylic acids and alpha-alkyl substituted acrylic acids wherein the alkyl radical in the alcohol portion of the ester radical contains from 1 to 6 carbon atoms and the alkyl radical substituted on the acrylic acid contains from 1 to 4 carbon atoms, the vinyl esters of the saturated monocarboxylic acids containing from 1 to 6 carbon atoms, the vinyl esters of the halogen acids, isobutylene, acrylonitrile, methacrylonitrile, ethacrylonitrile, styrene, and alpha-methylstyrene. The group also includes the allyl derivatives, such as the allyl esters of the monocarboxylic acids, as allyl acetate and allyl butyrate; the allyl esters of the polycarboxylic acids, such as diallyl phthalate, diallyl adipate, and diallyl succinate; the allyl esters of the inorganic acids, such as allyl chloride, methallyl chloride, etc.; the allyl esters of the unsaturated acids, such as allyl acrylate, allyl crotonate, and methallyl methacrylate, and the allyl ketones, allyl ethers, and the like, monoolefins, diolefins, vinyl pyridines, acrolein, methacrolein, acrylamide, vinyl pyrrolidinone, allylamine, and mixtures thereof. These dissimilar monomers preferably take up from .1% to 50% by weight of the mixture of monomers.

Coming under special consideration, particularly because of the improved properties as wet strength agents for paper are the terpolymers prepared by polymerizing the ammonium salt monomers noted above with an ethylenically unsaturated monomer which contains an aldehyde group or ketone group, and a second dissimilar ethylenically unsaturated monomer which preferably contains a halide group, ester group, nitrile group, amide group or the like. These special terpolymers are preferably made up of from 1% to 50% of the ammonium salt monomer, 3% to 45% of the monomer containing the aldehyde or ketone group, and 1% to 45% of the third dissimilar monomer.

The new polymers may be prepared by a variety of suitable methods. They may be prepared, for example, by contacting the monomers with a free radical yielding catalyst and preferably a peroxide catalyst and a reducing agent.

Examples of free radical yielding catalysts that may be employed include, among others, peroxides, such as benzoyl peroxide, hydrogen peroxide, potassium persulfate, potassium permanganate, methyl cyclohexyl peroxide, alkali perborates, diacetyl peroxide, tertiary butyl hydroperoxide, tertiary amyl hydroperoxide, acetyl benzoyl peroxide, cumene hydroperoxide, tetralin hydroperoxide, phenylcyclohexane hydroperoxide, tertiarybutylisopropyl benzene hydroperoxide, tertiary butyl peracetate, tertiary butyl perbenzoate, ditertiary butyl perphthalate, ditertiary butyl peradipate, tertiary butyl percarbonate and the like. Particularly preferred free radical yielding catalysts include the peroxides, such as the dialkyl peroxides, diaryl peroxides, tertiary alkyl hydroperoxides, alkyl peresters of percarboxylic acids, and particularly those of the above-noted groups which contain not more than 18 carbon atoms per molecule.

The above-described free radical yielding catalysts are employed in small amounts, the exact amount being dependent upon the particular type selected. In general, the amount of catalyst used will vary from about $1 \times 10^{-6}$ to about $2 \times 10^{-2}$ mols per mole of unsaturated monomer to be polymerized. Preferred amounts vary from about $1 \times 10^{-3}$ to $1 \times 10^{-4}$ mols per mol of material being polymerized.

The material employed with the above-described free radical yielding catalyst may include reducing agents, such as, for example, sodium hypophosphite, ferrous salts, sodium bisulfite, hydrazine, and the like.

The amount of the reducing agent employed will vary depending on the amount of the peroxide catalyst employed. It is preferred to have from about .3 mol to 1.5 mol of reducing agents per mol of peroxide catalyst. Preferably, the reducing agent is employed in an amount varying from about .5 to 1 mol per mol of peroxide.

The polymerization process is preferably conducted at a pH of about 2–8 (at lower or higher pH levels hydrolysis of cationic methacrylate may interfere).

Other materials, such as surface-active agents, may also be employed if desired, but are not necessary for operation of the process. Examples of surface active agents include the ionic agents and especially those having a polar structure including a hydrophobic (predominantly hydrocarbon) residue and a charged (ionic) radical thereon, such as cationic surface active compounds.

Non-ionic surface active agents, i.e., those which are not salts and are not subject to ionization when added to water include, among others, partial esters of polyhydric alcohols and saturated or unsaturated fatty acids and preferably fatty acids containing at least and more preferably from 12 to 18 carbon atoms, and hexitand and hexitides such as sorbitan or mannitan monolaurate, monopalmitate, monostearate, monooleate or the monoesters of coconut oil fatty acids and the like products described in U.S. 2,322,820. Other examples of partial esters of this type include the pentaerythritol mono- and dipalmitate, pentaerythritol mono- and distearate, pentaerythritol mono- and dioleate, 1,2,6-hexanetriol mono- and dicaproate, 1,2,6-hexanetriol mono- and dioleate, trimethylolpropane distearate, trimethylolpropane dilaurylate, polyglycerol dilaurate, inositol monolaurate, glucose monostearate, sucrose monooleate, polyglycol monooleate, polyglycol monostearate, and the like.

The reaction is preferably accomplished in the presence of solvents such as, for example, water and other polar solvents, such as dimethyl sulfoxide, alcohols, sulfolanes, dimethyl formamide, and the like. These are preferred over non-polar solvents as the cationic monomer is generally not soluble in the latter. Polymerization of the polymers may also be carried out in a hydrocarbon diluent such as pentane, isopentane, hexane, heptane, octane, and the like and the mixtures thereof with other components such as water, mixtures of water and acetone and the like.

In operating the process, all of the ingredients may be added at one time or one or more of the ingredients added to the reactor at a later time or intermittently or continuously throughout the reaction. It is desirable in many cases, and particularly in those cases of copolymerization where one of the monomers polymerizes much faster than the other, to add one or more of the monomers intermittently or continuously throughout the reaction. The monomers may be added so as to keep the ratio of concentration of the monomers substantilly constant or as to vary the ratio of concentrations as desired. Copolymers which have substantially homogeneous compositions are particularly desired.

The temperature employed in the process may vary over a considerable range. It is generally preferred to employ relatively low temperatures. In general, the temperatures will vary from the freezing point of the reaction mixture to about 50° C. Preferred temperatures range from about 0° C. to 45° C. Atmospheric, superatmospheric or subatmospheric pressures may be utilized as desired.

The polymerization is prefarably effected in an inert atmosphere. This may be preferably accomplished by passing inert gases, such as nitrogen, methane, etc., into and through the reaction mixture.

The process may be conducted batchwise or on a semicontinuous or continuous scale.

The polymers may be recovered from the reaction mixture in a great variety of different ways as by precipitation wtih solvents such as acetone, extraction, evaporation and the like.

The new polymers have substantially high molecular weights. They will preferably have intrinsic viscosities of at least 0.1 and preferably 0.5 to 5.0 dl./g. These values are determined by the conventional technique of polyelectrolyte (e.g., NaCl) viscosity measurements at 25° C. On a molecular weight basis, such polymers have molecular weights ranging preferably from about 25,000 to 10,000,000 as determined by the light scattering technique. The preferred products have intrinsic viscosities ranging from 0.3 dl./g. to 5.0 dl./g. as determined in 0.5 M NaCl of 25° C. or where applicable, in dimethyl sulfoxide containing 0.25 M tetrabutylammonium bromide at 25° C.

The new polymers possess a positive charge, i.e., they possess a plurality of side chains containing the quaternary ammonium group and the anion, and in addition possess a plurality of OH groups.

The terpolymers of the present invention possess many new and unobvious properties which make them useful and valuable in many important applications. As noted hereinabove, the new terpolymers are cationic and are frequently water-soluble. As a result, they find many applications in solution or as additives for various types of solutions. For example, they may be used in various aqueous polymerization systems or in various types of impregnation or treating solutions. As noted above, they are particularly useful and valuable as agents for treating fibrous materials, such as paper and the like. In this application, they tend to improve the properties, such as strength, crease resistance, fold endurance and the like. Materials that may be treated include, among others, textile fabrics and fibers, leather, paper, and the like. When used for the treatment of paper, these new watersoluble copolymers impart improved fold endurance and improved wet strength. They are particularly suited for the treatment of paper as they may be used on the alkaline side and without the use of alum as noted above.

The terpolymers may be employed for treatment of fibrous materials in a variety of ways. They are preferably employed as aqueous solutions when applied to the paper. The concentrations of the solutions preferred for this application preferably vary from about 0.1% to 50% aqueous solution.

The water solutions used in the treatment of the fibrous material preferably have a pH of from 2 to 9. As noted above their advantage is particularly evident when used on the alkaline side, even as at pH 7.0 to 9.

Emulsifying agents, water-dispersible binding colloids, plasticizers, anti-oxidants, dyes, fillers, curing agents, etc. may also be included in the aqueous system, but are not essential to obtaining the results set out above.

As indicated above, the aqueous systems containing the new terpolymers may be applied to the fibrous materials in any suitable way. If it is desired to apply the solution only to one surface of the material, as for example, when it is desired to treat the back only of a fabric or paper having a face of different material, the application may be effected by spraying as a liquid or gas or by means of rollers, or the compositions may be spread upon the surfaces by means of a doctor blade. When, however, it is desirable to coat both surfaces of the material, or if the material is to be thoroughly impregnated with it, the material may be simply dipped in the solution or run through conventional-type padding rollers. The solutions may also be applied locally to the material, for example, by means of printing rollers or by stencilling.

In the case of paper, the terpolymers or solutions thereof may be added at any stage during the wet end preparation. By wet end is meant any stage from the time the pulp is added to the water to the time when the pulp makes up more than the water. It is preferred to add the new copolymers at the beater stage. If one adds the new terpolymers during the beater stage, the beater operations may be any of those now used for this purpose. One merely needs to pour or otherwise add the polymer directly to the aqueous suspension of pulp either all at once or intermittently over a short period of time. The solid polymer derivatives may also be added directly at this stage.

If the aqueous system is to be applied to the finished paper, it may be added by spraying, by rollers, by dipping or by running the paper through a conventional-type padding apparatus. Amount of pick-up of the solution will vary, but in most cases vary from about 50% to 100% based on the weight of the paper.

After the aqueous solution has been applied to the fibrous material as indicated above, the treated product is dried to effect the cure. The drying may be accomplished by merely rolling or squeezing off the excess solution and then setting the treated product out in the air to dry, or by use of forced air. Temperatures used in the drying may vary from about room temperature, e.g., about 20° C. to 120° C. or higher. The period of drying will depend largely on the amount of pick-up and concentration of the polymer solution. In most instances, drying periods of about 1 to 30 minutes should be sufficient.

The above-described process may be utilized for the treatment of any fibrous material. This includes textile material, such as woven fabrics, non-woven fabrics, threads, yarn, cord, and string, paper, leather, films and the like. These materials may be prepared from natural or synthetic materials, such as cotton, linen, natural silk and artificial silk, such as silk obtained from cellulose acetate or other organic esters or ethers of cellulose, rayons, jute, hemp, animal fibers, such as wood, hair, and the like, as well as synthetic materials which include those prepared from polyamides, polyesters, polymers of vinyls, such as acrylonitrile, vinyl chloride, and the like.

The process is particularly suited for use in treating paper to improve properties such as wet strength, burst strength, fold endurance and the like. Examples of such papers include, for example, those prepared from wood, cotton, linen, hemp, jute, mulberry, straw, bamboo fibers or mixtures thereof, by any of the known processes, such as the sulfate process, soda process, sulfite process and the like. The new terpolymers are particularly suited for use in treating sulfite paper. The paper may be colored or white and may be further treated for special applications, and the paper may be pretreated with other resins and the like before application of the new copolymers.

The paper treated according to the process of the invention may be used for a variety of applications such as facial tissue, hand towels, maps, filing cards, construction paper, wrapping paper, containers and the like. Because of its resistance to hydrolysis and relative non-toxic nature, the paper is particularly suited for use in preparing wrapper paper or containers for food.

The new polymers of the invention are also useful for the treatment of fibers and fabrics as in the capacity of warp sizing agents and crease proofing materials, and as adhesives for cellulosic materials as wood, paper, sheets and the like.

The new polymers of the invention are also useful for the treatment of leather goods as tanning agents. The new polymers are effective for all kinds of leather, such as goat skin, calf skin, horse hides and the like.

The new terpolymers may also be used to form valuable esters, amides, ethers and polyurethane derivatives.

To illustrate the manner in which the invention may be carried out, the following examples are given. It is to be understood, however, that the examples are for the purpose of illustration and the invention is not to be regarded as limited to any of the specific materials or conditions recited therein. Unless otherwise indicated, parts are parts by weight.

Unless otherwise indicated, the intrinsic viscosity values reported in the examples are those determined by the conventional technique of polyelectrolyte viscosity measurements at 25° C. using 0.5 M sodium chloride.

*Example I*

This example illustrates the preparation and use of a terpolymer of 2-hydroxy-3-methacrylyloxypropyltrimethylammonium chloride, acrolein and stearyl methacrylate.

An emulsion was prepared from the following: 8.0 parts of 2-hydroxy-3-methacrylyloxypropyltrimethylammonium chloride, 50 parts of water, 0.56 part potassium persulfate, 4 parts of solution 0.5 M $NaH_2PO_2$ and 0.05 M in $CuSO_4$, 0.4 M parts 1 N $H_2SO_4$ 20 parts stearyl methacrylate, 16.8 parts acrolein and 0.1 part of a cationic emulsifier (hydroxyl alkyl trimethylammonium chloride ester of tall oil fatty acids).

The above emulsion was agitated under nitrogen for 4 days at room temperature. The polymer was precipitated by the addition of acetone. The polymer was washed with acetone and ethanol. Analysis indicated the terpolymer containing 17% of the alkyltrimethylammonium chloride monomer, 20% acrolein and 63% stearyl methacrylate.

A portion of the above-noted non-precipitated emulsion was used for wet-end addition to kraft pulp at pH 7.0. The properties of the resulting paper are as follows:

| Polymer, percent on Pulp | Burst Strength, p.s.i. | | Tensile, lbs./in. | | KBB Size Test, Sec. |
|---|---|---|---|---|---|
| | Dry | Wet | Dry | Wet | |
| 0 | 51 | 2 | 25 | 1 | 7 |
| 1 | 50 | 7 | 23 | 5.2 | |
| 2 | 50 | 12 | 24 | 8.0 | 67 |

*Example II*

This example illustrates the preparation and use of a terpolymer of 2-hydroxy-3-methacrylyloxypropyltrimethylammonium chloride, acrolein and vinyl acetate.

A solution was prepared by mixing the following ingredients: 30 parts of 0.02 M sodium acetate, 30 parts dimethyl sulfoxide, 0.2 part $K_2S_2O_8$, 5 parts 2-hydroxy-3-methacrylyloxypropyltrimethylammonium chloride, 21 parts acrolein and 9.3 parts vinyl acetate and 0.2 part sodium metabisulfite. The solution was agitated under nitrogen for 3 days at room temperature. The polymer was precipitated by adding excess ethanol. Analysis indicated the white solid terpolymer contained 33% of the trimethyl ammonium chloride units, 55% acrolein and 12% vinyl acetate units.

The above-described terpolymer was dissolved in water and added at the wet end of manufacture of regular kraft paper. The solution was added to the bleached pulp at pH 7.0. The properties of the resulting paper are indicated in the table below:

| Terpolymer, percent on Pulp | Burst, p.s.i. | |
|---|---|---|
| | Dry | Wet |
| 0 | 42 | 2 |
| 0.5 | 43 | 11 |
| 1.0 | 53 | 17 |

*Example III*

This example illustrates the preparation of a terpolymer of 2-hydroxy-3-methacrylyloxypropyltrimethylammonium chloride, acrolein and acrylonitrile.

A solution was prepared by mixing the following ingredients: 2.5 parts 2-hydroxy-3-methacrylyloxypropyltrimethylammonium chloride, 50 parts water, 5 parts of 5% $Na_2S_2O_5$, 3.75 parts acrolein, 3.75 parts acrylonitrile and 4 parts of 5% $K_2S_2O_8$. This mixture was shaken and then stirred overnight. A white terpolymer precipitate was obtained. Analysis indicated the product contained 40.3% acrolein, 39.5% acrylonitrile, and 20.2% of the trimethylammonium chloride monomer.

The above-noted terpolymer was insoluble in water but soluble in dimethylsulfoxide.

*Example IV*

This example illustrates the superiority of the terpolymers of the present invention as compared to copolymers containing the cationic monomers.

A terpolymer containing 32% 2-hydroxy-3-methacryloxypropyltrimethylammonium chloride, 37% acrolein and 31% acrylonitrile was prepared as in the preceding example. This will be referred to hereinafter as polyer A. A terpolymer containing 31% 2-hydroxy-3-methacryloxypropyltrimethylammonium chloride, 36% acrolein and 33% acrylonitrile (polymer B) was also prepared by the above-noted technique. A copolymer containing 34% 2-hydroxy-3-methacryloxypropyltrimethylammonium chloride and 66% acrolein was also prepared by the same method (polymer C).

Terpolymer B and copolymer C were used for treatment of unbleached kraft pulp at the wet end of manufacture. The results are shown in the following table:

| Polymer | Percent Polymer Applied | Mullen Burst Strength | |
|---|---|---|---|
| | | Dry | Wet |
| Copolymer C: | | | |
| pH 4.5 | 0 | 49 | 2 |
| | ½ | 42 | 9 |
| | 1 | 47 | 15 |
| pH 8 | ½ | 42 | 5 |
| | 1 | 46 | 9 |
| Terpolymer B: | | | |
| pH 4.5 | ½ | 60 | 20 |
| | 1 | 57 | 25 |
| pH 8 | ½ | 58 | 9 |
| | 1 | 59 | 14 |

The terpolymer A and copolymer C were also used for treatment of bleached sulfite pulp at the wet end of paper manufacture. The results are shown in the following table:

| Polymer | Percent Polymer Applied | pH | Mullen Burst Strength | |
|---|---|---|---|---|
| | | | Dry | Wet |
| Copolymer C | 0 | 4.5 | 34 | <1 |
| | ½ | 4.5 | 35 | 5 |
| Terpolymer A | ½ | 4.5 | 37 | 11 |
| | 1 | 4.5 | 46 | 15 |
| Copolymer C | ½ | 8 | 48 | 19 |
| | 1 | 8 | 35 | 4 |
| Terpolymer A | ½ | 8 | 40 | 10 |
| | 1 | 8 | 42 | 12 |
| | 1 | 8 | 47 | 18 |
| | 0 | 8 | 35 | <1 |

It is apparent from the above that the terpolymers give much better wet and dry strength to the paper products.

*Example V*

Example III was repeated with the exception that the monomer was changed as indicated:

| | 2-Hydroxy-3-Acrylyloxypropyltrimethylammonium chloride | Acrolein | Acrylonitrile | Wet Strength to paper | Water Solubility |
|---|---|---|---|---|---|
| A | 40 | 20 | 40 | Yes | Yes |
| B | 51 | 35 | 15 | Yes | Yes |
| C | 35 | 40 | 25 | Yes | Yes |

The above soluble polymers were added to kraft paper at the beater stage. The resulting paper had increased wet and dry strength as shown in the following table:

| Polymer | Percent on Pulp | Mullen Burst Strength, p.s.i. | |
|---|---|---|---|
| | | Dry | Wet |
| A | 1 | 61 | 18 |
| | 2 | 63 | 21 |
| B | 1 | 51 | 6 |
| | 2 | 54 | 10 |
| C | ½ | 56 | 8 |
| | 1 | 60 | 14 |
| Control | 0 | 46 | ~2 |

*Example VI*

This example illustrates the preparation and use of a terpolymer of 2 - hydroxy - 3 - methacrylyloxypropyltrimethylammonium chloride, acrolein and ethyl acrylate.

A solution was prepared by mixing the following ingredients: 3.0 parts 2-hydroxy-3-methacrylyloxypropyltrimethylammonium chloride, 50 parts of water, 5 parts of 5% sodium bisulfite solution, 3.0 parts acrolein, 4.0 parts ethyl acrylate and 4 parts of 4% potassium persulfate solution. This mixture was shaken and then stirred overnight. A white terpolymer emulsion was obtained. Analysis indicated the product contained 34% of the alkyenyloxytrimethylammonium chloride unit, 26% acrolein and 40% of the ethyl acrylate.

The above-noted terpolymer was diluted with water and utilized as a wet strength additive for kraft paper at the beater stage. The resulting paper product had improved wet strength as shown in the following table:

| Percent Polymer on Pulp | Formation pH | Mullen Burst Strength | |
|---|---|---|---|
| | | Dry | Wet |
| ½ | 4.5 | 51 | 8 |
| 1 | 4.5 | 50 | 12 |
| ½ | 8 | 40 | 5 |
| 1 | 8 | 51 | 9 |
| Control 0 | 8 | 45 | ~2 |

*Example VII*

This example illustrates the preparation and use of a terpolymer of 2 - hydroxy - 3 - methacrylyloxypropyltrimethylammonium chloride, acrolein and isoprene.

A solution was prepared by mixing the following ingredients: 3.0 parts 2-hydroxy-3-methacrylyloxypropyltrimethylammonium chloride, 37.5 parts dimethylsulphoxide, 12.5 parts water, 5 parts 5% sodium bisulfite, 3.5 parts acrolein, 3.5 parts of isoprene and 4 parts of 5% potassium persulfate. This mixture was shaken and then stirred overnight. A latex was obtained. Analysis indicated the polymer contained 25% of the trimethylammonium chloride units, 30% acrolein and 45% isoprene.

The above-mentioned terpolymer was added to water and utilized as a wet strength additive for kraft paper at the beater stage. The resulting paper product had improved wet strength.

*Example VIII*

This example illustrates the preparation and use of a terpolymer of 2-hydroxy-3-methacrylyloxypropyltrimethylammonium chloride, acrolein and styrene.

A solution was prepared by mixing the following ingredients: 3.0 parts 2-hydroxy-3-methacrylyloxypropyltrimethylammonium chloride, 37.5 parts dimethyl sulphoxide, 12.5 parts of water, 5 parts of 5% sodium bisulfite, 3.2 parts acrolein, 3.8 parts styrene and 4 parts of 5% potassium persulfate. This mixture was shaken and then stirred overnight. A clear terpolymer solution was obtained. Analysis indicated the product contained 28% of the trimethylammonium chloride unit, 33% acrolein and 39% styrene.

The above-noted terpolymer was diluted with water and utilized as a wet strength additive for kraft paper at the beater stage. The resulting paper product had improved wet strength as shown below:

| Percent Polymer on Pulp | Mullen Burst Strength, p.s.i. | |
|---|---|---|
| | Dry | Wet |
| 1 | 51 | 10 |
| Control | 45 | ~2 |

*Example IX*

This example illustrates the preparation and use of a terpolymer of 2-hydroxy-3-methacrylyloxypropyltrimethylammonium chloride, acrolein and vinylmethyl ketone.

A solution was prepared by mixing the following ingredients: 2.0 parts 2-hydroxy-3-methacrylyloxypropyltrimethylammonium chloride, 50 parts water, 5 parts of 5% sodium bisulfite, 4.0 parts acrolein, 4.0 parts of vinyl methyl ketone and 4 parts of 5% potassium persulfate. This mixture was shaken and then stirred overnight. A clear terpolymer solution was obtained. Analysis indicated the product obtained 30% of the trimethylammonium chloride units, 50% acrolein and 20% vinylmethyl ketone.

The above-mentioned terpolymer was added to water and utilized as a wet strength additive for sulphite paper at the beater stage. The resulting paper product had improved wet strength.

The above-noted terpolymer was added to water and utilized as a wet strength additive for kraft paper at the beater stage. The resulting paper product had improved wet strength.

*Example X*

This example illustrates the preparation and use of a terpolymer of 2-hydroxy-3-methacrylyloxypropyltrimethylammonium chloride, acrolein and acrylamide.

A solution was prepared by mixing the following ingredients: 3.3 parts 2-hydroxy-3-methacrylyloxypropyltrimethylammonium chloride, 50 parts water, 5 parts of 5% sodium bisulfite, 3.3 parts acrolein, 3.3 parts of acrylamide and 4 parts of 5% potassium persulfate. This mixture was shaken and then stirred overnight. A terpolymer was obtained. Analysis indicated the product contained 40% of the trimethylammonium chloride units, 20% acrolein and 40% acrylamide.

The above-mentioned terpolymer was diluted with water and utilized as a wet strength additive for kraft paper at the beater stage. The resulting paper product had improved wet strength as shown below:

| Percent Polymer on Pulp | Formation pH | Mullen Burst Strength | |
|---|---|---|---|
| | | Dry | Wet |
| ½ | 8 | 54 | 7 |
| 1 | 8 | 54 | 11 |
| 2 | 8 | 58 | 17 |
| ½ | 4.5 | 51 | 9 |
| 1 | 4.5 | 50 | 14 |
| Control 0 | 4.5 | 46 | ~2 |

*Example XI*

This example illustrates the preparation and use of a terpolymer of 2-hydroxy-3-methacrylyloxypropyltrimethylammonium chloride, acrolein and methyl methacrylate.

A solution was prepared by mixing the following ingredients: 3.0 parts 2-hydroxy-3-methacrylyloxypropyltrimethylammonium chloride, 50 parts of water, 5 parts of 5% sodium bisulfite, 3.5 parts acrolein, 3.5 parts methyl methacrylate, and 4 parts of 5% potassium persulfate. This mixture was shaken and then stirred overnight. A white terpolymer emulsion was obtained. Analysis indicated the product contained 33% of the trimethylammonium chloride unit, 26% acrolein and 40% of methyl methacrylate.

The above-noted terpolymer was diluted with water and utilized as a wet strength additive for kraft paper at the beater stage. The resulting paper product had improved wet strength.

*Example XII*

This example illustrates the preparation and use of a terpolymer of 2-hydroxy-3-acrylyloxypropyltrimethylammonium chloride, acrolein and acrylonitrile.

A solution was prepared by mixing the following ingredients: 32 parts 2-hydroxy-3-acrylyloxypropyltrimethylammonium chloride, 50 parts water, 5 parts of 5% sodium bisulfite, 37 parts acrolein, 31 parts of acrylonitrile, and 4 parts of 5% potassium persulfate. This mixture was shaken and then stirred overnight. A translucent terpolymer solution was obtained. Analysis indicated the product contained 32% of the trimethylammonium chloride units, 36% acrolein and 32% acrylonitrile.

The above-mentioned terpolymer was diluted with water and utilized as a wet strength additive for kraft paper at the beater stage. The resulting paper product had improved wet strength.

| Percent Polymer on Pulp (bleached sulfite) | Formation pH | Mullen Burst Strength, p.s.i. | |
|---|---|---|---|
| | | Dry | Wet |
| ½ | 8 | 45 | 12 |
| 1 | 8 | | 18 |
| ½ | 4.5 | 46 | 15 |
| 1 | 4.5 | | 19 |
| Control 0 | 4.5 | 35 | ~1 |

*Example XIII*

Examples I to XII are repeated using the following as the cationic monomers: 2-hydroxy-3-acryloxypropyltrimethylammonium nitrate, 2-hydroxy-3-crotonyloxypropyltrimethylammonium sulfate, 2-hydroxy-3-methacryloxypropyltributylammonium sulfate, 2-hydroxy-3-ethacryloxypropyltriethylammonium perchlorate, 2-hydroxy-3-methacryloxypropyltrimethylammonium iodide, 2-hydroxy-3-methacryloxypropyltriethylammonium fluoride. Related results are obtained.

I claim as my invention:
1. A cationic hydroxy-containing terpolymer of (1) 1% to 50% by weight of an ester of an alkenoic acid containing from 3 to 6 carbon atoms and glycidyl trialkylammonium salt wherein each alkyl group contains from

1 to 20 carbon atoms, (2) 3% to 45% by weight of an ethylenically unsaturated monomer of the group consisting of acrolein and methyl vinyl ketone, and (3) 1% to 45% by weight of a dissimilar ethylenically unsaturated monomer, the total amount of monomer making up 100% by weight and said terpolymer having an intrinsic viscosity between 0.5 dl./g. and 5.0 dl./g.

2. A cationic hydroxy-containing terpolymer of (1) 1% to 50% by weight of an ester of an alkenoic acid containing from 3 to 6 carbon atoms and a glycidyl trialkylamonium halide wherein each alkyl group contains from 1 to 20 carbon atoms, (2) 3% to 45% by weight of a dissimilar ethylenically unsaturated monomer of the group consisting of acrolein and vinyl methyl ketone group, and (3) 1% to 45% by weight of a dissimilar ethylenically unsaturated monomer the total amount of monomer making up 100% by weight and said terpolymer having an intrinsic viscosity between 0.5 dl./g. and 5.0 dl./g.

3. A cationic hydroxy-containing terpolymer of (1) 1% to 50% by weight of an unsaturated ester of the formula

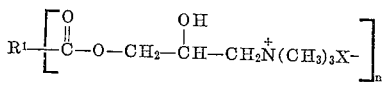

wherein X is halogen having an atomic number from 17 to 35, and $n$ is a whole number from 1 to 2 inclusive with the provision that when $n$ is 2, $R^1$ has no more than 4 carbon atoms, (2) 3% to 45% by weight of acrolein, and (3) 1% to 45% by weight of a dissimilar ethylenically unsaturated monomer said terpolymer having an intrinsic viscosity between 0.5 dl./g. and 5.0 dl./g.

4. A cationic hydroxy-containing terpolymer of 1% to 50% by weight of 2-hydroxy-3-alkenoyloxypropyltrialkylammonium halide wherein said alkenoyl moiety has from 3 to 6 carbon atoms and from 1 to 2 ethylenic linkages, each of said alkyls has from 1 to 4 carbon atoms, and said halogen has an atomic number of from 17 to 35, (2) 3% to 45% by weight of acrolein, and (3) 1% to 45% by weight of a dissimilar ethylenically unsaturated monomer the total amount of monomer making up 100% by weight and said terpolymer having an intrinsic viscosity between 0.5 dl./g. and 5.0 dl./g.

5. A terpolymer as in claim 4 wherein component (1) is a 2-hydroxy-3-alkenoyloxypropyltrialkylammonium halide.

6. A terpolymer as in claim 4 wherein component (1) is 2 - hydroxy - 3 - methacrylyloxypropyltrimethylammonium chloride.

7. A terpolymer as in claim 4 wherein component (1) is 2 - hydroxy - 3 - acrylyloxypropyltrimethylammonium chloride.

8. A terpolymer as in claim 4 wherein the dissimilar monomer is an ethylenically unsaturated hydrocarbon containing from 3 to 12 carbon atoms.

9. A terpolymer as in claim 4 wherein the dissimilar unsaturated monomer (3) is an ethylenically unsaturated nitrile.

10. A terpolymer as in claim 4 wherein the dissimilar unsaturated monomer (3) is an ethylenically unsaturated amide.

11. A terpolymer as in claim 4 wherein the dissimilar unsaturated monomer is N-vinylpyrolidone.

12. A terpolymer of 1% to 50% by weight of 2-hydroxy - 3 - alkenoyloxyalkyltrialkylammonium chloride wherein each alkyl radical contains from 1 to 12 carbon atoms, 3% to 45% by weight of acrolein and 1% to 45% by weight of acrylamide, the total amount of monomer making up 100% by weight and said terpolymer having an intrinsic viscosity between 0.5 dl./g. and 5.0 dl./g.

13. A terpolymer of 1% to 50% by weight of 2-hydroxy - alkenoyloxypropyltrialkylammonium chloride wherein each alkyl radical contains from 1 to 12 carbon atoms, 3% to 45% by weight of acrolein and 1% to 45% by weight of isoprene, the total amount of monomer making up 100% by weight and said terpolymer having an intrinsic viscosity between 0.5 dl./g. and 5.0 dl./g.

14. A terpolymer of 1% to 50% by weight of 2-hydroxy - 3 - alkenoyloxypropyltrialkylammonium chloride wherein each alkyl radical contains from 1 to 12 carbon atoms, 3% to 45% by weight of acrolein and 1% to 45% by weight of styrene, the total amount of monomer making up 100% by weight and said terpolymer having an intrinsic viscosity between 0.5 dl./g. and 5.0 dl./g.

15. A terpolymer of 1% to 50% by weight of 2-hydroxy - 3-methacrylyloxypropyltrimethylammonium chloride, 3% to 45% by weight of acrolein and 1% to 45% by weight of acrylonitrile, the total amount of monomer making up 100% by weight and said terpolymer having an intrinsic viscosity between 0.5 dl./g. and 5.0 dl./g.

16. A terpolymer of 1% to 50% by weight of 2-hydroxy - 3 - methacrylyloxypropyltrimethylammonium chloride, 3% to 45% by weight of acrolein and 1% to 45% by weight of stearyl methacrylate, the total amount of monomer making up 100% by weight and said terpolymer having an intrinsic viscosity between 0.5 dl./g. and 5.0 dl./g.

17. A process for treating fibrous paper materials to improve the properties thereof which comprises applying to the fibrous material an aqueous solution of a cationic terpolymer defined in claim 1.

18. A process for treating fibrous paper material to improve properties thereof which comprises applying to the said material an aqueous solution of a water-soluble cationic terploymer defined in claim 12.

19. A process for treating fibrous material to improve properties thereof which comprises applying to the said material an aqueous solution of a water-soluble cationic terploymer defined in claim 13.

References Cited
UNITED STATES PATENTS

| | | | |
|---|---|---|---|
| 2,484,487 | 10/1949 | Caldwell | 260—486 |
| 2,617,781 | 11/1952 | Lytton | 260—80.5 |
| 2,630,427 | 3/1953 | Hwa | 260—86.7 |
| 2,676,166 | 4/1954 | Webers | 260—86.1 |
| 2,980,657 | 4/1961 | Melamed | 260—80.5 |

JAMES A. SEIDLECK, *Primary Examiner.*

JOSEPH L. SCHOFER, *Examiner.*